June 11, 1929.  W. L. D'OLIER  1,717,313

FILTER SCREEN

Filed July 15, 1926

William L. D'Olier INVENTOR.

BY

Gifford & Scull

ATTORNEYS

Patented June 11, 1929.

1,717,313

UNITED STATES PATENT OFFICE.

WILLIAM L. D'OLIER, OF PHILADELPHIA, PENNSYLVANIA, ASSIGNOR, BY MESNE ASSIGNMENTS, TO C. H. GRAY AND JOHN SCHAAF, BOTH OF BUFFALO, NEW YORK, AND W. G. PEUCHEN, OF NORTH TONAWANDA, NEW YORK.

FILTER SCREEN.

Application filed July 15, 1926. Serial No. 122,552.

This invention relates to a filter screen of the type in which a metallic wall is provided with openings through which the liquid passes while the solid materials are retained upon the wall. In order to enable the solids to be brushed off, it is desirable to have the openings of an elongated form and to brush the surface of the filter screen longitudinally of the openings to remove the solids. It has been found that when a plate is milled or cut through to provide slots for filtering purposes, the plate is considerably weakened and the method of forming the filter screen is expensive. By the present invention a filter screen is provided in an economical manner and possesses considerable strength. At the same time, the slots or openings through which the liquids pass are so formed that danger of the same clogging is minimized. As herein shown by the illustrative embodiments of the invention, these slots or openings are so formed that they are narrower on the inlet side of the screen than they are on the outlet side, so that whatever solids enter the slots or openings do not become tightly packed in the same so as to stop up the openings, but the solids that enter the slots are permitted to pass entirely therethrough. At the same time, a layer of solids may be permitted to collect upon the inlet side of the screen through which the subsequent liquid is permitted to pass and become filtered.

Figure 1:
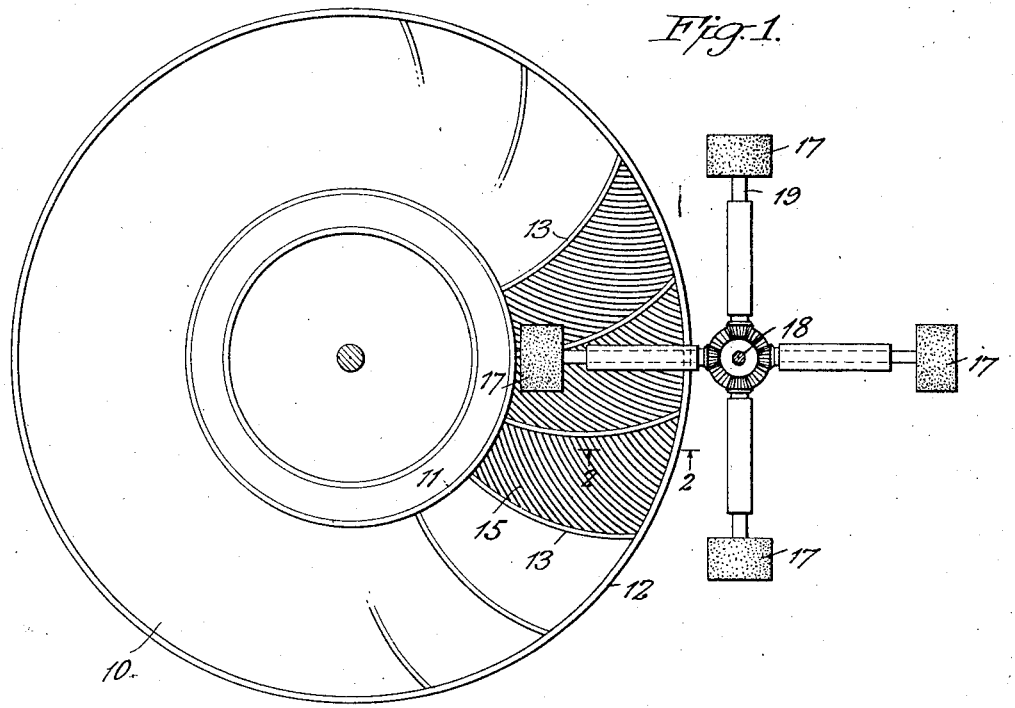
Figure 2:
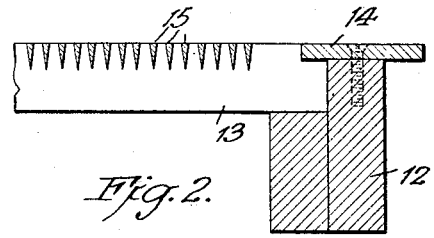

The invention will be understood from the description in connection with the accompanying drawings, in which Fig. 1 is a plan view showing a screen and brush therefor; Fig. 2 is a section along the line 2—2 of Fig. 1 and Figs. 3, 4 and 5 are similar sections showing modifications. In the drawings, reference character 10 indicates a screen that may be made in the form of a disc and mounted at an inclination to the horizontal, so that one edge may dip into the liquid that is to be filtered, while the opposite edge is above the surface of the liquid, the screen being provided with means (not shown) for rotating the same, so as to bring successive portions into the liquid. The screen may be provided with concentric circular members 11 and 12, between which the filtering portion of the screen is located. Cross bars 13 that may be slightly curved and located approximately on radial lines of the screen are connected between the members 11 and 12 and may be retained in place by means of cap pieces 14, as indicated in Fig. 2.

Ribbons or strips 15 may be seated in slots in the members 11 and 12 and cross bars 13, in such a manner that these strips are parallel to each other. In the illustrative embodiment shown in Fig. 2, these strips 15 are V-shaped in cross-section, and are installed with their narrow edges toward the outlet side of the screen, while their wider edges are toward the inlet side, thus providing narrow, long, curved slots through the screen that are wider at the outlet side of the screen than at the inlet side thereof. These ribs or strips 15 are preferably curved, as indicated, so that as the brushes 17 sweep thereover as they are turned about the center axis 18 and are revolved about their own axes 19, they will move during one part of their travel over the screen in directions parallel or approximately parallel to the slots, so as to sweep the solid materials off.

Figure 3:
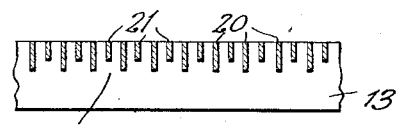

In the modification shown in Fig. 3, the strips or ribbons are made with each one rectangular in cross-section, but with the alternate ones 20 wider than the intermediate ones 21 and with the edges that are on the inlet side of the filter screen flush with each other, thus providing spaces 22 between the other edges of the wider strips that are of greater extent than would be the case if all of the ribbons were of the same width. In this way, the tendency for the slots to become clogged is decreased and, at the same time, the requisite mechanical strength of the screen surface is obtained.

Figure 4:
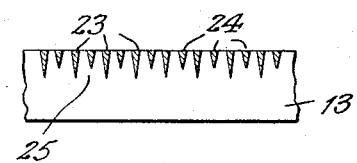

In the modification shown in Fig. 4, all of the ribbons are made V-shaped in cross-sections, the alternate ones 23 being made wider than the intermediate ones 24, so as to provide not only for slots of increasing width, but also to provide very wide spaces 25 between the outlet edges of the wide strips and, at the same time, provide sufficient mechanical strength for the screen.

Figure 5:
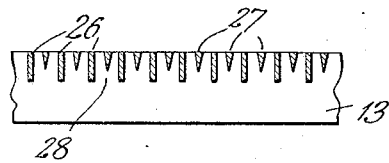

In the modification shown in Fig. 5, the wide strips 26 are rectangular in shape, while the intermediate strips 27 are narrower and V-shaped in cross-section, thus providing slots between the strips of increasing size, and also providing wide spaces, as shown at 28, between the outlet edges of the wide strips and, at the same time, providing sufficient mechanical strength for the screen.

While the invention has been specifically described in connection with a disc-shaped screen, it is to be understood that it is also applicable to screens of other shapes, such as drum, cylindrical, band screens, etc., and that the strips or ribbons may be either straight or curved. Other changes and modifications may be made without departing from the spirit or scope of the invention.

I claim:

1. In a filter screen, a plurality of strips forming the filtering elements of said screen, alternate strips being wider than the intermediate strips.

2. In a filter screen, a plurality of curved strips spaced apart to form passages therebetween and so shaped and located that the total cross-sectional area of the passages at their outlets is greater than that at their inlets, the curvature of said strips being struck on a center outside of said screen.

WILLIAM L. D'OLIER.